(12) United States Patent
Fahldieck

(10) Patent No.: US 9,181,042 B2
(45) Date of Patent: Nov. 10, 2015

(54) DEVICE FOR TRANSFERRING BOTTLES HELD IN THE NECK AREA BY MEANS OF GRIPPERS OR THE LIKE

(75) Inventor: Andreas Fahldieck, Idar-Oberstein (DE)

(73) Assignee: KHS GmbH, Dortmund (DE)

( * ) Notice: Subject to any disclaimer, the term of this patent is extended or adjusted under 35 U.S.C. 154(b) by 632 days.

(21) Appl. No.: 13/148,716

(22) PCT Filed: Mar. 25, 2010

(86) PCT No.: PCT/EP2010/001873
§ 371 (c)(1), (2), (4) Date: Aug. 10, 2011

(87) PCT Pub. No.: WO2010/124768
PCT Pub. Date: Nov. 4, 2010

(65) Prior Publication Data
US 2011/0308916 A1    Dec. 22, 2011

(30) Foreign Application Priority Data
Apr. 27, 2009    (DE) .......................... 10 2009 018 733

(51) Int. Cl.
*B65G 25/00*    (2006.01)
*B65G 47/84*    (2006.01)

(52) U.S. Cl.
CPC ...... *B65G 47/846* (2013.01); *B65G 2201/0247* (2013.01)

(58) Field of Classification Search
USPC ........... 198/440, 441, 449, 450, 459.2, 470.1, 198/474.1, 478.1, 867.02, 867.05, 867.06, 198/867.07, 867.08, 803.3, 803.7, 803.8, 198/803.9, 803.1
See application file for complete search history.

(56) References Cited

U.S. PATENT DOCUMENTS

| | | | |
|---|---|---|---|
| 3,502,120 A * | 3/1970 | Rydström | 198/480.1 |
| 3,880,294 A * | 4/1975 | Arseneault | 198/468.2 |
| 5,341,620 A | 8/1994 | Katou et al. | |
| 6,446,781 B1 * | 9/2002 | De Villele | 198/364 |
| 6,591,967 B1 | 7/2003 | Doudement et al. | |
| 6,692,050 B2 * | 2/2004 | Graffin | 294/104 |
| 7,000,756 B2 * | 2/2006 | Wittmann et al. | 198/470.1 |
| 7,200,975 B2 | 4/2007 | Till | |
| 7,311,515 B2 * | 12/2007 | Netsu | 425/534 |
| 2007/0256911 A1 | 11/2007 | Legallais et al. | |
| 2009/0077933 A1 * | 3/2009 | Backhaus et al. | 53/561 |

FOREIGN PATENT DOCUMENTS

| | | |
|---|---|---|
| DE | 4236784 | 5/1993 |
| DE | 10345317 | 4/2005 |
| EP | 1520813 | 4/2005 |
| GB | 665506 | 1/1952 |
| WO | 02/34652 | 5/2002 |

* cited by examiner

*Primary Examiner* — William R Harp
(74) *Attorney, Agent, or Firm* — Occhiuti & Rohlicek LLP

(57) ABSTRACT

An apparatus for transferring a container disposed in a transfer area of a container-processing machine from a first component to a second component includes a first gripper for holding the container in a neck area thereof, the first gripper being associated with the first component; a second gripper for receiving the container from the first gripper by holding the container in a neck area thereof, the second gripper being associated with the second component; and a diverting element for sliding or transferring the container from the first gripper to the second gripper when the first and second grippers are in the transfer area. When disposed in the transfer area, the first and second grippers are coplanar with each other and positioned facing each other.

16 Claims, 5 Drawing Sheets

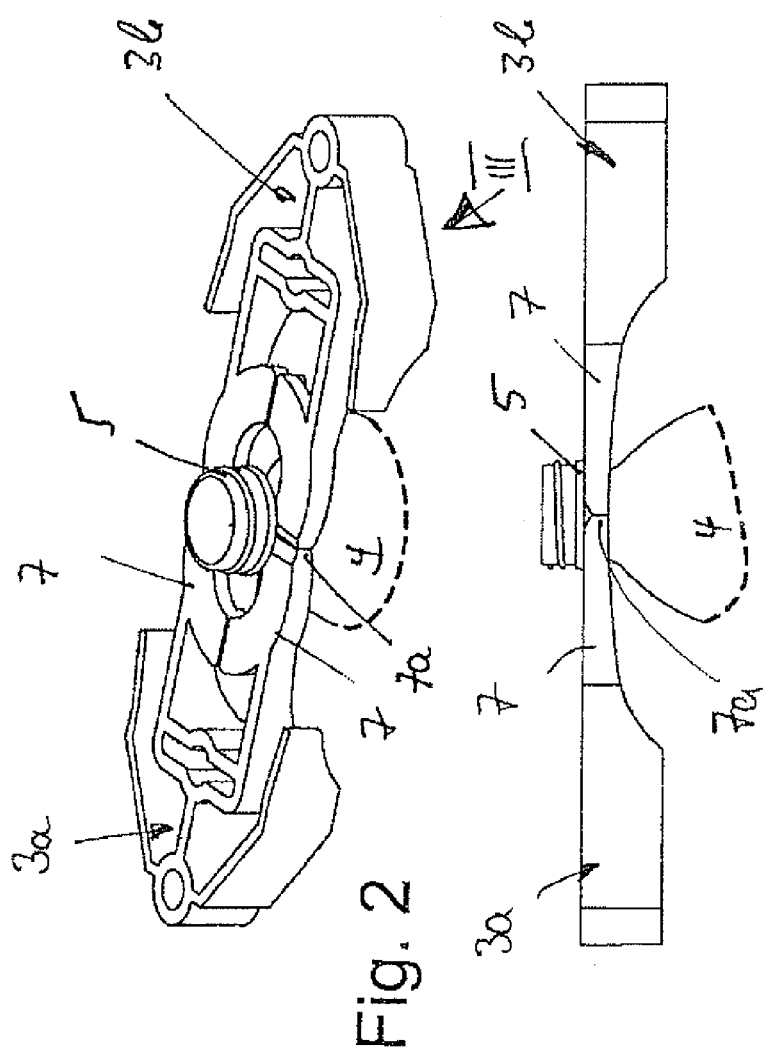

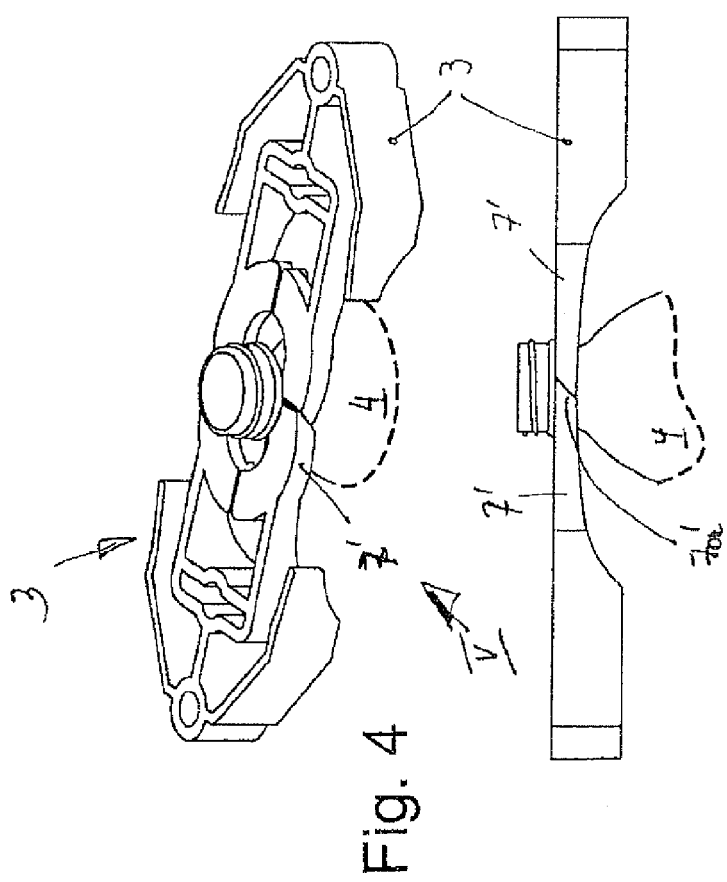

DEVICE FOR TRANSFERRING BOTTLES HELD IN THE NECK AREA BY MEANS OF GRIPPERS OR THE LIKE

CROSS-REFERENCE TO RELATED APPLICATIONS

This application is the National Stage of International Application No. PCT/EP2010/001873, filed on Mar. 25, 2010, which claims the benefit of the priority date of German Patent Application No. 10 2009 018 733.2, filed on Apr. 27, 2009. The contents of both applications are hereby incorporated by reference in their entirety.

FIELD OF INVENTION

The invention relates to a device for transferring containers that are held in the neck area thereof by grippers from one transport star wheel to another, particularly in bottle cleaning and filling plants for plastic bottles, for example.

BACKGROUND

In the course of being transported through a plant, a bottle is held in the neck area by grippers, clips, clamps and comparable elements. The clamps are positioned on transport star wheels. Some clamps have an inherent opening and closing behavior for instance due to an intrinsic flexibility or due to being spring-loaded. Other clamps are actively opened and closed.

To transfer bottles from one transport star wheel to another transport star wheel, it is known to configure the transport star wheels with their clamp paths partially overlapping and to push the bottles from one clamp into the other. This construction is relatively complicated and difficult to clean.

It has become increasingly to handle PET bottles without a securing groove in order to save weight. As a result, the neck ring must perform the task of a securing groove.

SUMMARY

An object of the invention is to hold such bottles only in one plane, namely generally below the neck ring.

This object is achieved by positioning grippers on a plane in the transfer area with their delivery opening and acceptance opening one in front of the other in the transfer area, and providing a diverting element for sliding or transferring the bottle from a gripper of one transport star wheel to a gripper of another other transport star wheel.

As a result of the invention, bottles are held in one plane by the two clamps, and pushed out of one gripper or clip into the other gripper or clip in this plane. In the system shown here, the transfer from one transport star wheel to the other means that the movement paths of the bottle axes do not run tangentially, as is the case with meshing clamps or grippers. As a result, the transfer from one transport star wheel to the next is improved since the opposed centrifugal forces are decoupled. The radial push is an intermediate step that subjects the bottle to an impulse above the center of gravity of the bottle. This impulse counteracts or attenuates the deflection caused by the centrifugal force of the first transport star wheel.

In some embodiments, front sides of the gripper arms of opposing grippers bear bluntly against one another. In other embodiments, the grippers have gripper arms that have a straight front edge that bears bluntly against a front edge of an opposed gripper arm at the transfer point.

In a further embodiment, front sides of the gripper arms of the grippers of one transport star wheel have an end profile at an angle to the horizontal plane. Corresponding, opposite front sides of grippers on the other transport star wheel have a complementary contour so that the front sides mate with one another when positioned opposite each other.

Advantageously, it may also be provided according to the invention that the front sides of the grippers of one transport star wheel are provided with a V-shaped groove and the opposite front sides of the grippers of the other transport star wheel are provided with a wedge-shaped configuration that engages in the groove and/or that the front sides of the grippers of one transport star wheel are provided with a semicircular groove and the opposite front sides of the grippers of the other transport star wheel are provided with a bead.

In one aspect, the invention features an apparatus for transferring a container disposed in a transfer area of a container-processing machine from a first component of the container-processing machine to a second component of the container-processing machine. Such an apparatus includes a first gripper and a second gripper, both of which grasp the container in a neck area thereof. The first gripper is associated with the first component and has arms that protrude from the first component. The second gripper receives the container from the first gripper by grasping it in a neck area thereof. The second gripper is associated with the second component and has arms that protrude from the second component. The apparatus further includes a diverting element for sliding or transferring the container from the first gripper to the second gripper when the first and second grippers are in the transfer area. When disposed in the transfer area, the first and second grippers are coplanar with each other and positioned facing each other.

In some embodiments, the first gripper comprises a straight front edge, and the second gripper comprises a straight front edge. The first and second grippers are disposed opposite each other in the transfer area so that the straight front edge of the first gripper bears bluntly against the straight front edge of the second gripper.

Also included within the invention's scope are embodiments in which the first gripper comprises a front edge beveled at a first angle, and the second gripper comprises a front edge beveled at a second angle selected to mate with the beveled front edge of the first gripper. In these embodiments, when the first and second grippers are disposed opposite each other in the transfer area, the beveled front edge of the first gripper mates with the beveled front edge of the second gripper.

Yet other embodiments include those in which the first gripper comprises a front side having a V-shaped groove, and the second gripper comprises a front side having a wedge-shaped configuration for engaging the V-shaped groove when the first and second grippers are disposed opposite each other in the transfer area, as well as those in which the first gripper comprises a front side having a semicircular groove, and the second gripper comprises a front side having a bead for engaging the semicircular groove when the first and second grippers are disposed opposite each other in the transfer area.

In some embodiments, the first and second components are star wheels.

Also included are embodiments in which the first and second grippers are configured to both hold and grasp a container.

In yet other embodiments, the first gripper comprises a first arm and a second arm. In these embodiments, the first and second arm protrudes from the first component. The first arm and seconds arm together define a recess therebetween so that the container is simultaneously held and grasped within the recess by the first and second arms. In some of these embodiments, at least one of the first and second arms is movable. In others of these embodiments, the first arm is configured to apply a force in the direction of said second arm, and wherein said second arm is configured to apply a force in the direction of said first arm, and the second arm is configured to apply a force in the direction of the first arm.

Also included are embodiments in which the diverting element comprises a cam.

In another aspect, the invention features an apparatus for transferring a container disposed in a transfer area of a container-processing machine from a first component of the container-processing machine to a second component of the container-processing machine. Such an apparatus has first and second grippers. The first gripper, which is associated with the first component, holds the container in a neck area thereof. The second gripper, which is associated with the second component, receives the container from the first gripper by holding the container in a neck area thereof. The apparatus further includes diverting element for sliding or transferring the container from the first gripper to the second gripper when the first and second grippers are in the transfer area. When disposed in the transfer area, the first and second grippers are coplanar with each other and positioned facing each other. The first and second grippers each have a straight front edge. When the first and second grippers are disposed opposite each other in the transfer area, their respective straight front edges bear bluntly against each other.

DESCRIPTION OF THE DRAWINGS

Further features, details and advantages of the invention will become apparent from the following description and with reference to the drawing, in which:

FIG. 2 shows a three-dimensional view of such a pair of clips in the transfer position, FIG. 3 shows a side view along III in FIG. 2, FIGS. 4 and 5 show a clip variant in the same view as FIGS. 2 and 3.

DETAILED DESCRIPTION

Figure 1:
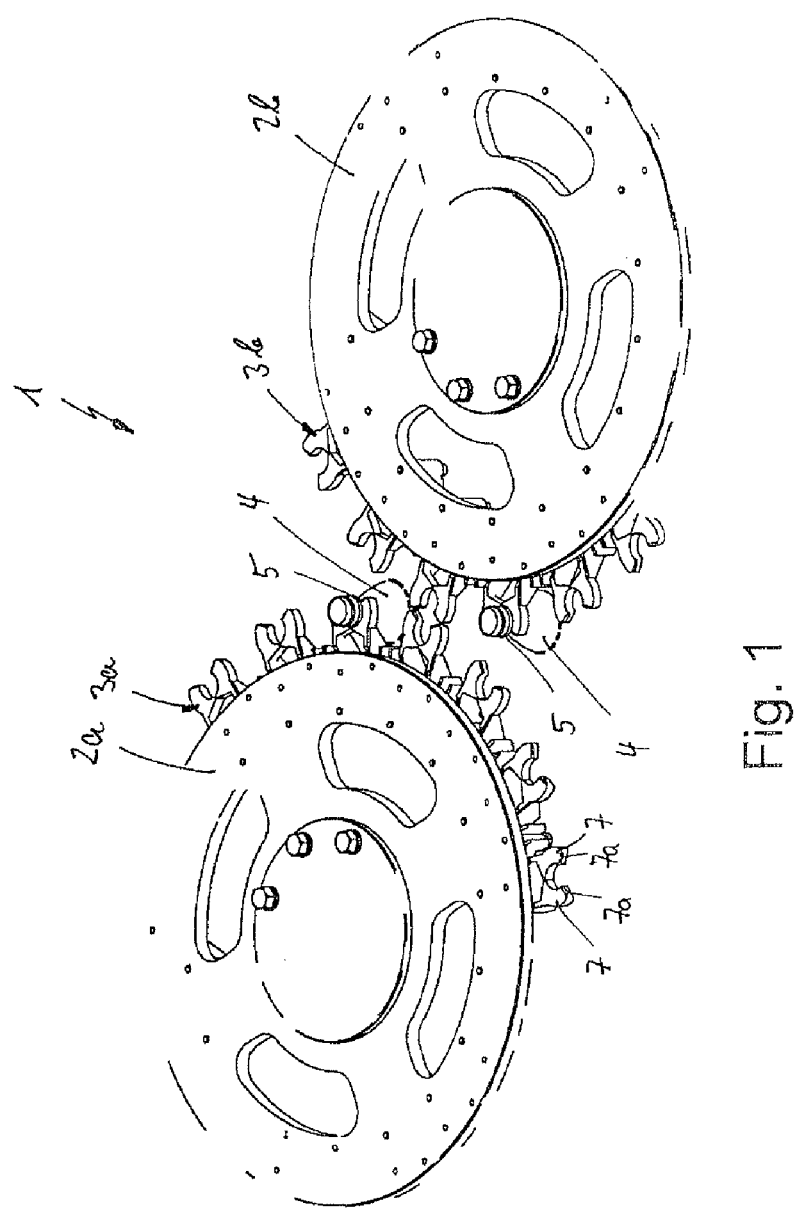
FIG. 1 shows a schematic view in elevation of two transport star wheels with bottle clips and indicated bottles.
Figure 6:
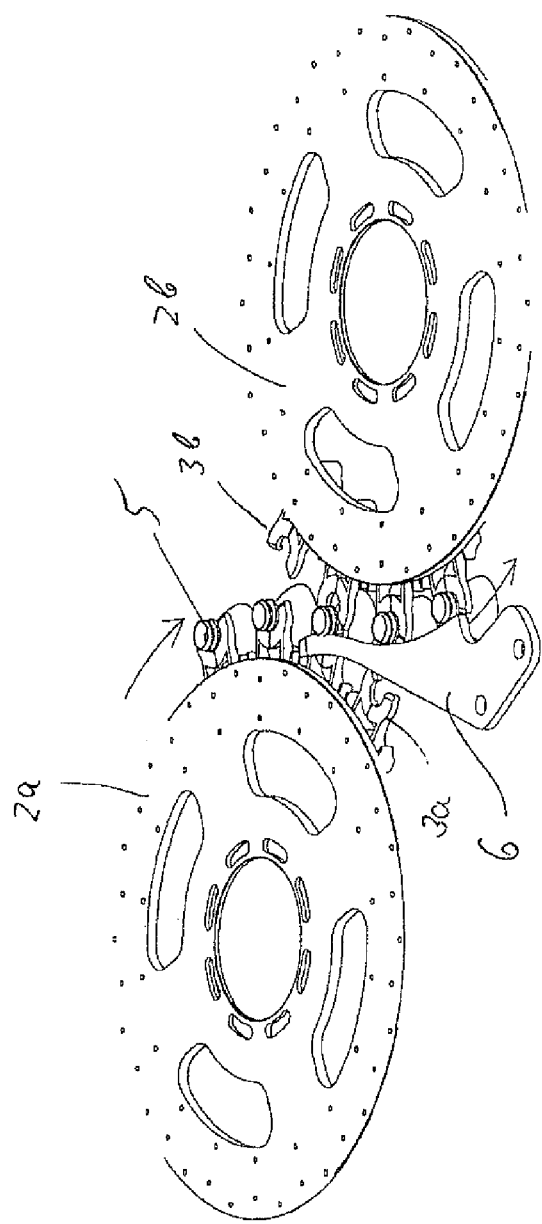
FIG. 6 shows a view of the transfer position from transport star wheel to transport star wheel, approximately in the same view as FIG. 1, FIGS. 7 and 8 show yet another clip variant.

FIG. 1 shows a device 1 that comprises a first transport star wheel 2*a* and a second transport star wheel 2*b* that is associated with the first transport star wheel 2*a*. The first transport star wheel 2*a* has a plurality of first clamps or first grippers 3*a* distributed around its circumference. Similarly, the second transport star wheel 2*b* has second grippers 3*b* distributed around its circumference. Each first or second gripper 3*a*, 3*b* can grasp a bottle 4 at its neck area 5. The aim is to transfer a bottle 4 from a first gripper 3*a* into a second gripper 3*b* of the second transport star wheel 2*b* in the position shown in FIG. 1. This can be brought about by forced guidance using a transfer cam 6 or a similar component, as shown in FIG. 6.

As can be seen, the first grippers 3*a* and the second grippers 3*b* lie on precisely the same plane in such a way that they are located with their gripper arms 7 or the front sides 7*a* thereof bluntly in front of one another. As a result, in the position shown in FIG. 1, a bottle 4 can be pushed out of the gripper arms 7 of a first gripper 3*a* and into gripper arms of an opposed second gripper 3*b*. This position is shown on an enlarged scale in FIG. 2.

FIGS. 4 and 5 show a modified embodiment of the clamp or gripper 3. In this modified embodiment, the gripper arms 7' of a first gripper 3*a* have a front side 7*a*' that is beveled on one side and that is configured in such a way as to mate with a complementary bevel on a gripper arm of an opposed second gripper 3*b*, as shown in FIG. 5.

Figure 7:
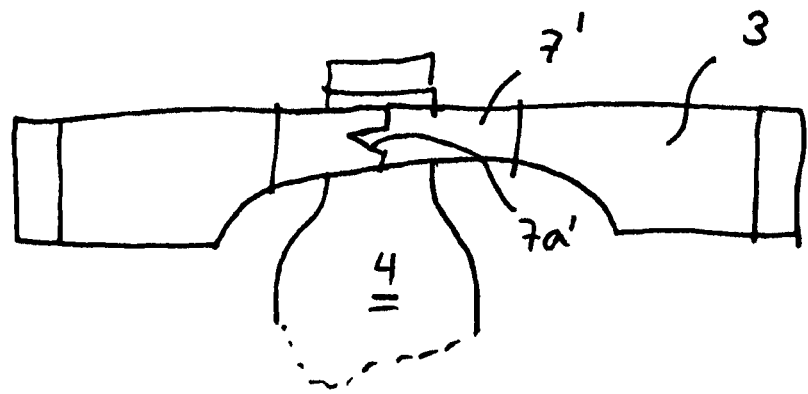

FIG. 7 shows another modified embodiment in which a gripper arm 7' of a first gripper 3*a* has a front side 7*a*' that has a V-shaped groove on one side and a gripper arm of an opposed second gripper 3*b* has a wedge on the other side that is configured to mate with the V-shaped groove.

Figure 8:
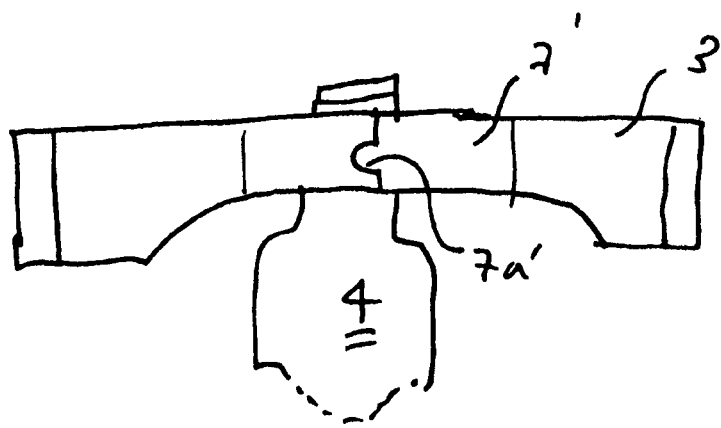

FIG. 8 show yet another modified embodiment of the clamp or gripper 3 in which the gripper arm 7' of a first gripper 3*a* has a front side 7*a*' that has a semi-circular groove on one side and the gripper arm of an opposed second gripper 3*b* has a bead on the other side that is configured to mate with the groove.

In one particularly advantageous embodiment, the first grippers 3*a*, which are on the first transport star wheel 2*a*, are mounted in such a way that they can pivot in the circumferential direction of a first transport star wheel 3*a* and in a plane spanned by the grippers. The first grippers 3*a* can thus somewhat follow the movement of the bottles 4 or containers during the transfer. This promotes trouble-free operation.

In another advantageous embodiment, the first and second grippers 3*a*, 3*b* of adjacent first and second transport star wheels 2*a*, 2*b* are mounted in such a way that they can pivot in the respective circumferential directions of the first and second star wheels 2*a*, 2*b*. A suitable angle range required here is at most up to ±30° relative to a radius of the respective first or second transport star wheel 2*a*, 2*b*. Grippers 3*a*, 3*b* mounted in this way generally pivot within an angle range of 5° to 15° on either side of the radius.

Another embodiment achieves a comparable result or advantage using grippers 3*a*, 3*b* or clips that have elastic gripping arms 7 and/or main bodies, so that it is likewise possible to follow or hasten to meet the bottle movement. The combination of pivotability and elasticity is also advantageous. In such an embodiment, a pivotably mounted gripper 3*a*, 3*b* or clip additionally has elastic grippers and/or an elastic main body.

Other examples include combinations of the mating structures shown in FIGS. 7-8. For instance, one gripper front side may be configured as a V-shaped groove, while the engagement side of the opposite transport star wheel is wedge-shaped or the like. A transport star wheel can be a filler star wheel, rinser star wheel, or the like without departing from the scope of the invention.

The invention claimed is:

1. An apparatus for transferring a container disposed in a transfer area of a container-processing machine from a first component of the container-processing machine to a second component of the container-processing machine, said apparatus comprising a first gripper for grasping the container in a neck area thereof, said first gripper being associated with said first component, wherein said first gripper comprises arms that protrude from said first component; a second gripper for receiving the container from said first gripper by grasping said container in a neck area thereof, said second gripper being associated with said second component, wherein said second gripper comprises arms that protrude from said second component; and a diverting element for sliding or transferring the container from said first gripper to said second gripper when said first and second grippers are in said transfer area; wherein, when disposed in said transfer area, said first and second grippers are coplanar with each other and positioned facing each other.

2. The apparatus of claim 1, wherein: said first gripper comprises a straight front edge, and said second gripper comprises a straight front edge, wherein, when said first and second grippers are disposed opposite each other in said transfer area, said straight front edge of said first gripper bears bluntly against said straight front edge of said second gripper.

3. The apparatus of claim 1, wherein said first gripper comprises a front edge beveled at a first angle, and said second gripper comprises a front edge beveled at a second angle selected to mate with said beveled front edge of said first gripper, wherein, when said first and second grippers are disposed opposite each other in said transfer area, said beveled front edge of said first gripper mates with said beveled front edge of said second gripper.

4. The apparatus of claim 1, wherein said first gripper comprises a front side having a V-shaped groove, and said second gripper comprises a front side having a wedge-shaped configuration for engaging said V-shaped groove when said first and second grippers are disposed opposite each other in said transfer area.

5. The apparatus of claim 1, wherein said first gripper comprises a front side having a semicircular groove, and said second gripper comprises a front side having a bead for engaging said semicircular groove when said first and second grippers are disposed opposite each other in said transfer area.

6. The apparatus of claim 1, wherein said first gripper is mounted to pivot circumferentially around a turning circle in a plane spanned by said first gripper.

7. The apparatus of claim 6, wherein said second gripper is mounted to pivot circumferentially around a turning circle spanned by said second gripper.

8. The apparatus of claim 6, wherein said first gripper pivots across a range of angles extending ±30° relative to a vertical of said turning circle.

9. The apparatus of claim 7, wherein said first and second grippers pivot across a range of angles extending ±30° relative to a vertical of their respective turning circles.

10. The apparatus of claim 1, wherein at least one of said first and second components comprises a star wheel.

11. The apparatus of claim 1, wherein said first and second grippers are configured to both hold and grasp a container.

12. The apparatus of claim 1, wherein said first gripper comprises a first arm and a second arm, wherein said first arm and said second arm protrude from said first component, wherein said first arm and said second arm define a recess therebetween, wherein said container is simultaneously held and grasped within said recess by said first arm and said second arm.

13. The apparatus of claim 12, wherein at least one of said first and second arms is movable.

14. The apparatus of claim 12, wherein said first arm is configured to apply a force in the direction of said second arm, and wherein said second arm is configured to apply a force in the direction of said first arm.

15. The apparatus of claim 1, wherein said diverting element comprises a cam.

16. An apparatus for transferring a container disposed in a transfer area of a container-processing machine from a first component of the container-processing machine to a second component of the container-processing machine, said apparatus comprising a first gripper for holding the container in a neck area thereof, said first gripper being associated with said first component; a second gripper for receiving the container from said first gripper by holding said container in a neck area thereof, said second gripper being associated with said second component; and a diverting element for sliding or transferring the container from said first gripper to said second gripper when said first and second grippers are in said transfer area; wherein, when disposed in said transfer area, said first and second grippers are coplanar with each other and positioned facing each other, wherein said first gripper comprises a straight front edge, and said second gripper comprises a straight front edge, wherein, when said first and second grippers are disposed opposite each other in said transfer area, said straight front edge of said first gripper bears bluntly against said straight front edge of said second gripper.

* * * * *